(12) United States Patent
Enomoto

(10) Patent No.: US 7,510,042 B2
(45) Date of Patent: Mar. 31, 2009

(54) SEAT BELT APPARATUS FOR VEHICLE

(75) Inventor: Takaaki Enomoto, Anjo (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/508,834

(22) Filed: Aug. 24, 2006

(65) Prior Publication Data

US 2006/0284406 A1 Dec. 21, 2006

Related U.S. Application Data

(63) Continuation of application No. 10/718,698, filed on Nov. 24, 2003, now Pat. No. 7,195,089.

(30) Foreign Application Priority Data

Dec. 5, 2002 (JP) ............................. 2002-353692

(51) Int. Cl.
  B60R 22/36 (2006.01)
  B60R 22/46 (2006.01)
(52) U.S. Cl. .................. 180/268; 280/806; 280/807; 280/282
(58) Field of Classification Search .............. 180/268, 180/282; 280/806, 807
  See application file for complete search history.

(56) References Cited

U.S. PATENT DOCUMENTS

| 5,552,986 | A | 9/1996 | Omura |
| 5,558,370 | A | 9/1996 | Behr |
| 5,605,202 | A | 2/1997 | Dixon |
| 5,718,451 | A | 2/1998 | White |
| 5,765,774 | A | 6/1998 | Maekawa et al. |
| 5,788,281 | A | 8/1998 | Yanagi et al. |
| 6,179,330 | B1 | 1/2001 | Wier |
| 6,616,186 | B1 | 9/2003 | Midorikawa et al. |
| 6,618,655 | B2 | 9/2003 | Tobaru |
| 6,626,463 | B1 | 9/2003 | Arima et al. |
| 6,629,575 | B2 | 10/2003 | Nikolov |
| 6,702,326 | B1 | 3/2004 | Fujii |
| 6,863,308 | B2 | 3/2005 | Motozawa |
| 2001/0040065 | A1 | 11/2001 | Takagi et al. |
| 2001/0054816 | A1 | 12/2001 | Brambilla et al. |

(Continued)

FOREIGN PATENT DOCUMENTS

CA 2340801 9/2001

(Continued)

Primary Examiner—Ruth Ilan
(74) Attorney, Agent, or Firm—Oliff & Berridge, PLC

(57) ABSTRACT

In the seat belt apparatus of the invention, a belt retracting motor is operated so as to retract the seat belt by a predetermined amount when it is determined that the vehicle will roll over based on a lateral acceleration, a roll rate and a roll angle which are detected and calculated by a lateral acceleration sensor and a roll rate sensor, according to a predetermined first determination condition. Also, a pretensioner is operated so as to retract the seat belt by a predetermined amount when it is determined that the vehicle will roll over according to a second determination condition indicating that there is a higher possibility of rollover. When it is determined that the vehicle will not roll over, operation of the belt retracting motor is cancelled, and the seat belt is permitted to be pulled out.

8 Claims, 6 Drawing Sheets

U.S. PATENT DOCUMENTS

2004/0212189 A1 10/2004 Kachu

FOREIGN PATENT DOCUMENTS

| | | |
|---|---|---|
| DE | 100 01 991 A1 | 7/2001 |
| DE | 100 05 010 A1 | 8/2001 |
| DE | 196 36 448 C2 | 9/2001 |
| DE | 101 19 504 A1 | 10/2002 |
| DE | 600 20 160 T2 | 1/2006 |
| EP | 1 211 144 A2 | 6/2002 |
| JP | A-11-170976 | 6/1999 |
| JP | A-2001-55105 | 2/2001 |
| JP | A-2002-283949 | 10/2002 |

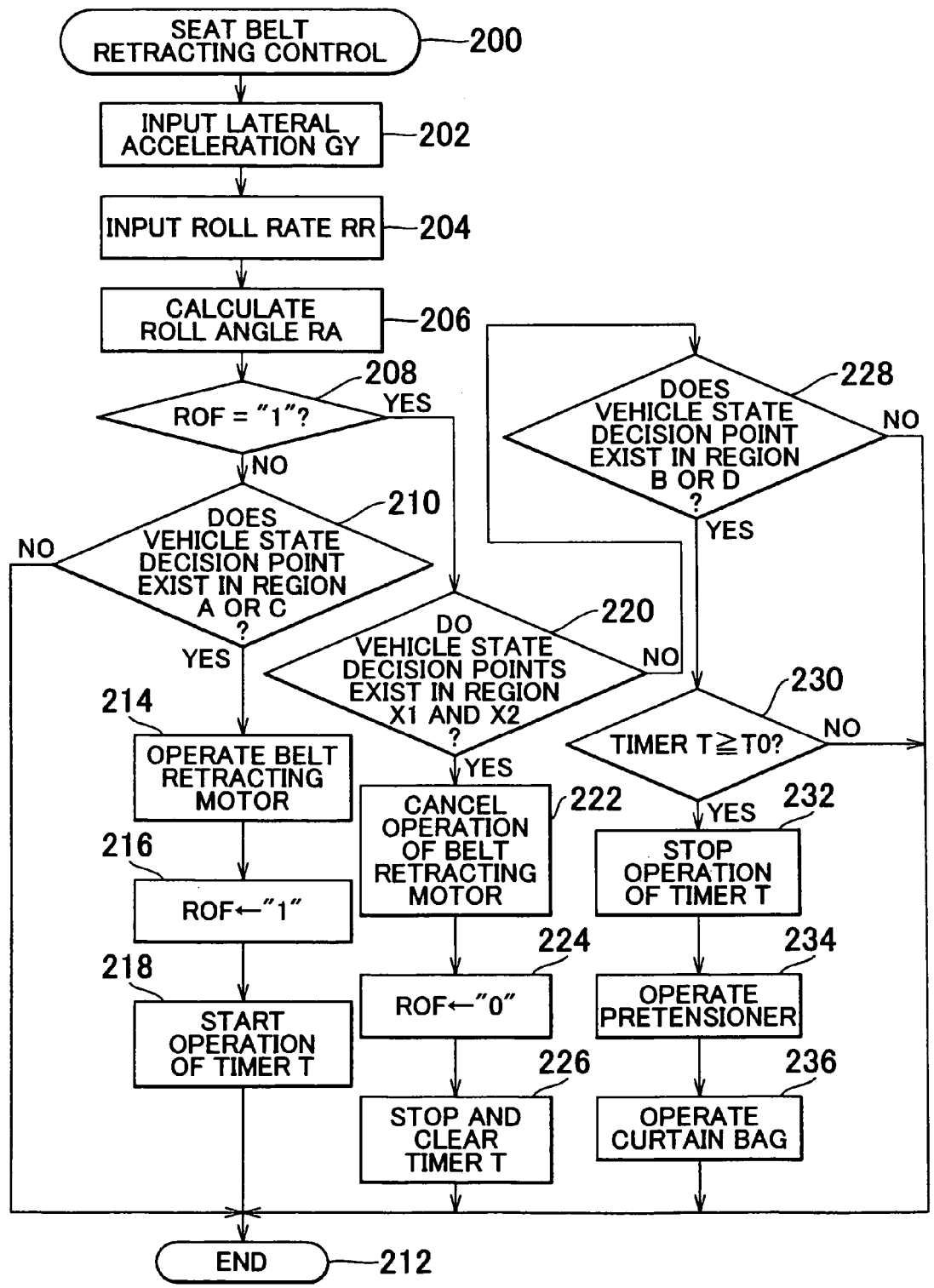

SEAT BELT APPARATUS FOR VEHICLE

INCORPORATION BY REFERENCE

This is a Continuation Application of application Ser. No. 10/718,698 filed Nov. 24, 2003 now U.S. Pat. No. 7,195,089. This application claims the benefit of Japanese Patent Application No. 2002-353692 filed on Dec. 5, 2002. The entire disclosures of the referenced documents are hereby incorporated by reference in their entirety.

BACKGROUND OF THE INVENTION

1. Field of the Invention

The invention relates to a seat belt apparatus for a vehicle, in which a seat belt can be retracted when the vehicle rolls over.

2. Description of the Related Art

Japanese Patent Laid-Open Publication No. 11-170976 discloses a seat belt apparatus for a vehicle, in which a seat belt can be retracted when the vehicle rolls over, according to related art. In the seat belt apparatus for a vehicle according to related art, a gravity sensor that detects a direction in which gravity is applied to the vehicle is provided. Based on the direction, in which gravity is applied to the vehicle, it is determined whether the vehicle will roll over. When it is determined that the vehicle will roll over, a pretensioner is operated so as to retract the seat belt, and prohibits the seat belt from being pulled out.

In the seat belt apparatus, when a determination condition as to whether the vehicle will roll over is strict, much time is required for obtaining the result of the determination, and the seat belt cannot be retracted in time when the vehicle rolls over. Accordingly, in order to retract the seat belt in time when the vehicle rolls over, it is necessary to relax the determination condition as to whether the vehicle will roll over. In this case, however, even when rollover of the vehicle is avoided due to a change in a road surface state, driving operation, or the like after it is determined that the vehicle will roll over, the seat belt is retracted, and is prohibited from being pulled out. Therefore, although the vehicle has not rolled over, an occupant is restrained.

SUMMARY OF THE INVENTION

In view of the above, it is an object of the invention to provide a seat belt apparatus for a vehicle which can reliably protect an occupant when the vehicle rolls over. Also, it is another object of the invention to provide a seat belt apparatus for a vehicle which can release the occupant from restraint of the retracted seat belt when rollover of the vehicle is avoided after it is determined that the vehicle will roll over.

In order to achieve the aforementioned objects, according to an aspect of the invention, a first seat belt apparatus for a vehicle is provided. The first seat belt apparatus for a vehicle includes a first belt retractor which can retract a seat belt of the vehicle, and which permits the retracted seat belt to be pulled out; a second belt retractor which can retract the seat belt of the vehicle, and which prohibits the retracted seat belt from being pulled out; a movement state quantity detector which detects a movement state quantity of the vehicle that indicates a possibility of rollover of the vehicle; a first belt retracting controller which determines that the vehicle will roll over and controls the first belt retractor such that the first belt retractor retracts the seat belt when the movement state quantity detected by the movement state quantity detector satisfies a predetermined first determination condition; and a second belt retracting controller which determines that the vehicle will roll over and controls the second belt retractor such that the second belt retractor retracts the seat belt when the movement state quantity detected by the movement state quantity detector satisfies a predetermined second determination condition that indicates a higher possibility of rollover of the vehicle than the predetermined first determination condition.

In the first seat belt apparatus, the first belt retracting controller controls the first belt retractor such that the first belt retractor retracts the seat belt when the first belt retracting controller determines that the vehicle will roll over according to the predetermined first determination condition that is less strict. Then, the second belt retracting controller controls the second belt retractor such that the second belt retractor retracts the seat belt when the second belt retracting controller determines that the vehicle will roll over according to the second determination condition that is strict. At this time, the first belt retractor has already retracted the seat belt by a predetermined amount. Therefore, the time required for the second belt retractor to finish retracting the seat belt is short, as compared with a case where the seat belt is retracted only by the second belt retractor, without using the first belt retractor. Thus, the occupant can be reliably restrained when the vehicle rolls over.

In the invention, the first belt retracting controller and the second belt retracting controller may be operated separately. Even when the first belt retractor has not retracted the seat belt by a predetermined amount due to the control by the first belt retracting controller in advance, only the second belt retractor may retract the seat belt due to the control by the second belt retracting controller. Thus, the operation load of the first belt retractor can be reduced.

According to another aspect of the invention, a second seat belt apparatus for a vehicle is provided. The second seat belt apparatus for a vehicle includes a first belt retractor which can retract a seat belt of the vehicle, and which permits the retracted seat belt to be pulled out; a second belt retractor which can retract the seat belt of the vehicle, and which prohibits the retracted seat belt from being pulled out; a movement state quantity detector which detects a movement state quantity of the vehicle that indicates a possibility of rollover of the vehicle; a first belt retracting controller which determines that the vehicle will roll over and controls the first belt retractor such that the first belt retractor retracts the seat belt when the movement state quantity detected by the movement state quantity detector satisfies a predetermined first determination condition; and a second belt retracting controller which determines that the vehicle will roll over and controls the second belt retractor such that the second belt retractor retracts the seat belt when the movement state quantity detected by the movement state quantity detector satisfies a predetermined second determination condition after the first belt retracting controller determines the possibility of rollover of the vehicle.

In the second seat belt apparatus, the first belt retracting controller controls the first belt retractor such that the first belt retractor retracts the seat belt when the first belt retracting controller determines that the vehicle will roll over according to the predetermined first determination condition that is less strict. Then, the second belt retracting controller controls the second belt retractor such that the second belt retractor retracts the seat belt when the second belt retracting controller determines that the vehicle will roll over according to the predetermined second determination condition that is strict. At this time, the first belt retractor has already retracted the seat belt by a predetermined amount. Therefore, the time required for the second belt retractor to finish retracting the seat belt is short, as compared with a case where the seat belt is retracted only by the second belt retractor without using the first belt retractor. Thus, the occupant can be reliably restrained when the vehicle rolls over.

BRIEF DESCRIPTION OF THE DRAWINGS

The above mentioned embodiment and other embodiments, objects, features, advantages, technical and industrial significance of this invention will be better understood by reading the following detailed description of the exemplary embodiments of the invention, when considered in connection with the accompanying drawings, in which:

FIG. 4 is a flowchart of a seat belt retracting control program, which is executed by the electronic control unit shown in FIG. 1 according to the second embodiment of the invention;

DETAILED DESCRIPTION OF THE PREFERRED EMBODIMENTS

In the following description, the present invention will be described in more detail in terms of exemplary embodiments.

First Embodiment

Figure 1:
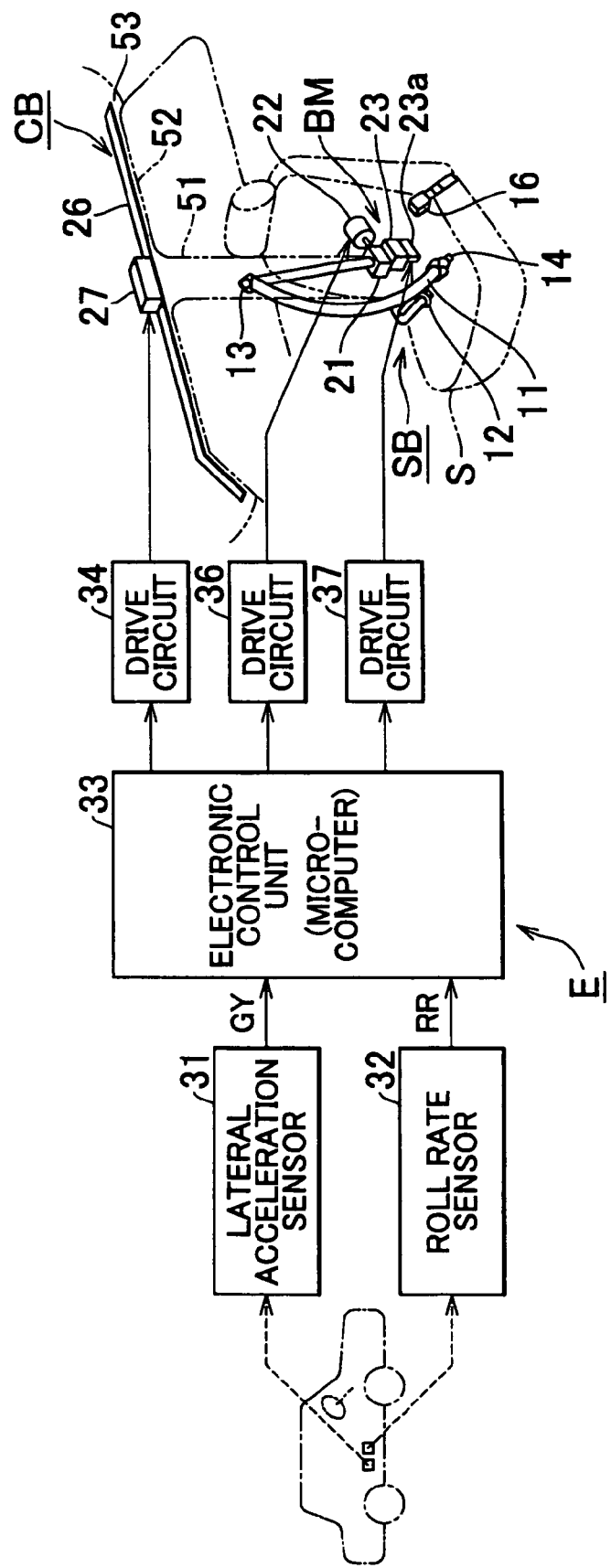
FIG. 1 is an overall schematic view of an occupant protection system according to first to third embodiments of the invention.

FIG. 1 is a block diagram schematically showing an entire occupant protection system employing a seat belt apparatus according to the first embodiment. The occupant protection system protects an occupant when the vehicle rolls over. The occupant protection system includes a seat belt apparatus and a curtain bag apparatus associated with the seat belt apparatus. Both the seat belt apparatus and the curtain bag apparatus have an electric control device E. The seat belt apparatus has a seat belt mechanism portion SB, and the curtain bag apparatus has a curtain bag mechanism portion CB. The seat belt mechanism portion SB can retract a seat belt when a vehicle rolls over. The seat belt mechanism portion SB includes a seat belt 11 provided on one side of a seat S, an anchor 12, a slip joint 13, a tongue blade 14, a belt retractor BM, and a buckle 16 provided on the other side of the seat S.

One end of the seat belt 11 is connected to the anchor 12, and the other end of the seat belt 11 enters the belt retractor BM. The seat belt 11 is hung on the slip joint 13 at an intermediate portion. The anchor 12 is fitted to a flame of the seat S on one side of the seat S so as to be tiltable. The tongue blade 14 is fitted to the seat belt 11 so as to be tiltable at a portion between the anchor 12 and the slip joint 13. The buckle 16 is fitted to the flame of the seat S on the other side of the seat S. The tongue blade 14 can be fitted to the buckle 16, and can be removed from the buckle 16.

The belt retractor BM is fitted to a lower portion of a center pillar 51. The belt retractor BM includes a belt retracting mechanism portion 21, a belt retracting motor 22, and a pretensioner 23 including an inflator 23a. The belt retracting mechanism 21 is connected to an end portion of the seat belt 11, and permits the seat belt 11 to be retracted and pulled out. The belt retracting motor 22 is an electric motor which is connected to the belt retracting mechanism portion 21. The belt retracting motor 22 can retract the seat belt 11 through the belt retracting mechanism portion 21, and permits the retracted seat belt to be pulled out. The pretensioner 23 is connected to the belt retracting mechanism portion 21, and is operated using a gas that is injected and supplied from the inflator 23a. The pretensioner 23 can retract the seat belt 11 through the belt retracting mechanism portion 21, but prohibits the retracted seat belt 11 from being pulled out. The inflator 23a injects the gas toward the pretensioner 23 so as to supply the gas to the pretensioner 23. The inflator 23a is integrally provided with the pretensioner 23. The belt retracting motor 22 corresponds to the first belt retractor, and the pretensioner 23 corresponds to the second belt retractor. The first belt retractor and the second belt retractor may be the same belt retractor.

The curtain bag mechanism portion CB is provided in a side portion of a vehicle compartment. The curtain bag mechanism portion CB includes a curtain bag 26 and an inflator 27. The curtain bag 26 is unfolded and expanded in a curtain shape so as to protect the head of the occupant in a front seat and the head of the occupant in a rear seat. When the curtain bag 26 is housed along a roof side rail 52, the curtain bag 26 is accordion-folded in a vertical direction, and is covered with a roof head lining 53. The inflator 27 supplies the gas to the curtain bag 26. Also, since the inflator 27 injects the gas toward the curtain bag 26, the inflator 27 is disposed along the roof side rail 52 above the curtain bag 26, and is covered with the roof head lining 53.

The electric control device E includes a lateral acceleration sensor 31, a roll rate sensor 32, and an electronic control unit 33. The lateral acceleration sensor 31 detects an acceleration GY in a lateral direction, and is connected to the electronic control unit 33. The roll rate sensor 32 detects a rotation angle around an axis that passes through the center of gravity of the vehicle, and extends in a fore-and-aft direction of the vehicle, that is, a roll rate RR. The roll rate sensor 32 is connected to the electronic control unit 33. The lateral acceleration sensor 31 and the roll rate sensor 32 correspond to the movement state quantity detector according to the invention.

Figure 2:
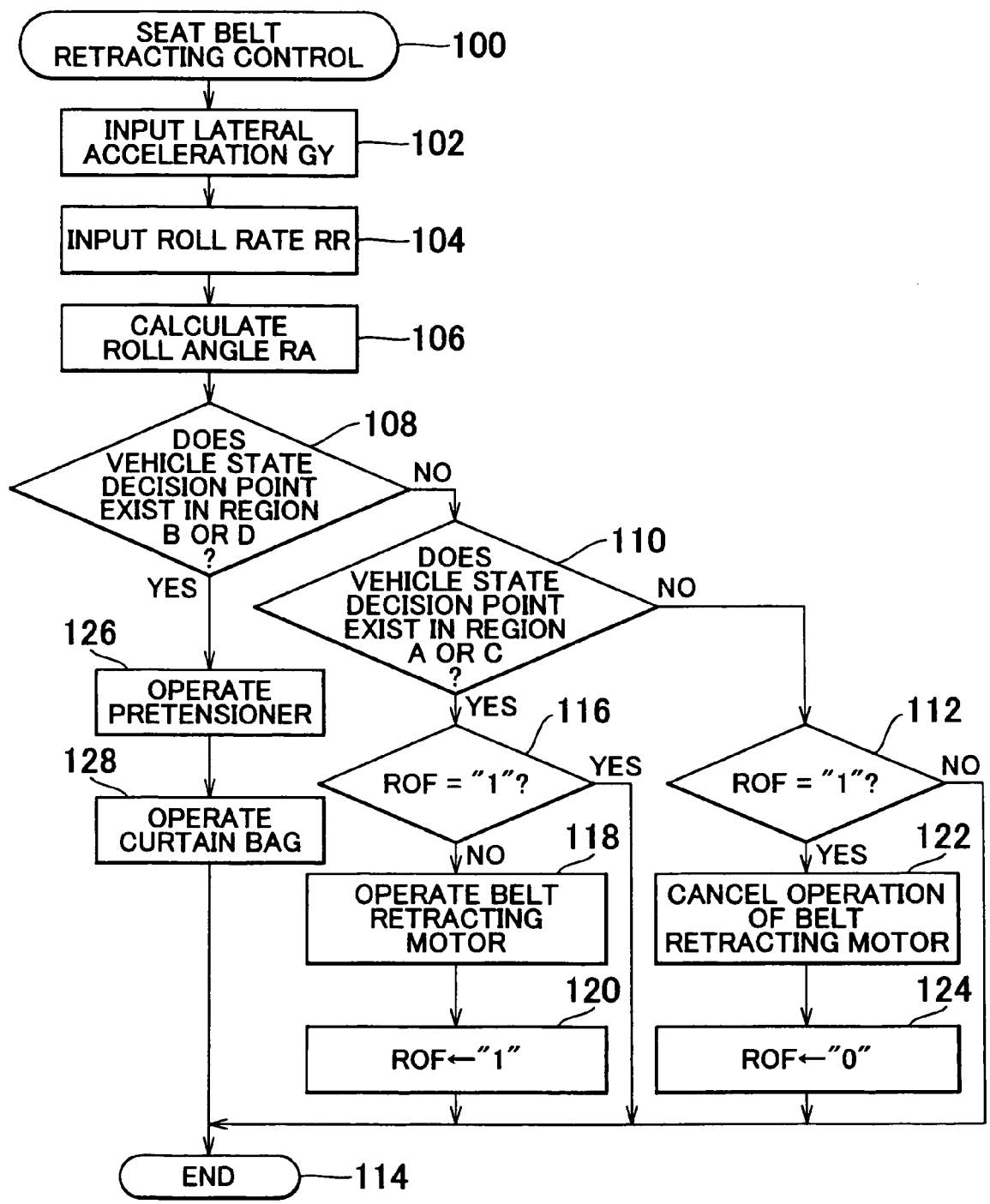
FIG. 2 is a flowchart of a seat belt retracting control program, which is executed by an electronic control unit shown in FIG. 1.

The electronic control unit includes a microcomputer as a main component thereof. The microcomputer includes a CPU, ROM, RAM, and a timer. The electronic control unit executes a seat belt retracting control program shown in FIG. 2 at predetermined short time intervals, thereby controlling the seat belt mechanism portion SB and the curtain bag mechanism portion CB according to a situation where the vehicle rolls over.

Drive circuits 34, 36, 37 are connected to the electronic control unit 33. The drive circuit 34 ignites the inflator 27 of the curtain bag mechanism portion CB so as to generate the gas inside the inflator 27 according to a control signal from the electronic control unit 33. The drive circuit 36 operates the belt retracting motor 22 of the belt retractor BM, or cancels the operation of the belt retracting motor 22, according to the control signal from the electronic control unit 33. The drive circuit 37 ignites the inflator 23a of the belt retractor BM so as to generate the gas inside the inflator 23a.

The operation of the occupant protection system thus configured according to the first embodiment of the invention will be described. When an ignition switch is turned on, the electronic control unit 33 starts to execute the seat belt retracting control program shown in FIG. 2 repeatedly at the predetermined short time intervals. The seat belt retracting control program starts in step 100. The lateral acceleration GY is input in step 102, and the roll rate RR is input in step 104. Next, the roll rate RR is integrated with respect to time so as to calculate a roll angle RA.

Figure 3A:
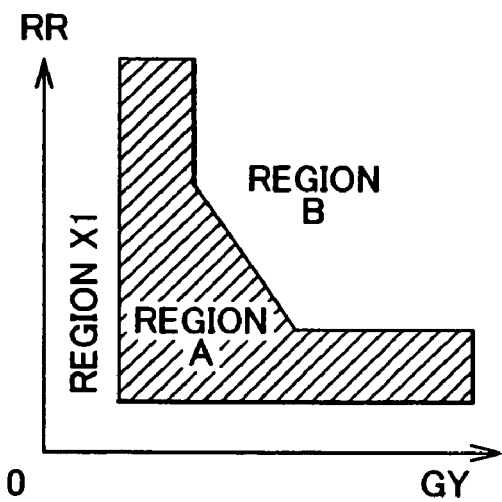
FIG. 3A is a map composed of a lateral acceleration GY and a roll rate RR of the vehicle, which is used by the electronic control unit shown in FIG. 1 when determining the possibility of rollover of the vehicle according to the first embodiment and the second embodiment of the invention.

Next, the process proceeds to step 108, and it is determined whether a point that is decided based on the lateral acceleration GY input in step 102 and the roll rate RR input in step 104 (hereinafter, referred to as "vehicle state decision point a") is in a rollover region B in a map shown in FIG. 3A. Also, in step 108, it is determined whether a point that is decided based on the roll angle RA input in step 106 and the roll rate RR input in step 104 (hereinafter, referred to as "vehicle state decision point b") is in a rollover region D in a map shown in FIG. 3B. The rollover region B is a region in which there is a high possibility of rollover in a two dimensional region composed of the lateral acceleration GY and the roll rate RR. The rollover region D is a region in which there is a high possibility of rollover in a two dimensional region composed of the roll angle RA and the roll rate RR. In other words, it is determined whether there is a high possibility of rollover in step 108.

First, a case where there is no possibility of rollover will be described. In this case, the vehicle state decision point a does not exist in the rollover region B, and the vehicle state decision point b does not exist in the rollover region D. Therefore, a negative determination is made in step 108, and the process proceeds to step 110. In step 110, it is determined whether the vehicle state decision point a exists in a rollover region A in the map shown in FIG. 3A, and whether the vehicle state decision point b exists in a rollover region C in the map shown in FIG. 3B. The rollover region A is a region in which there is a lower possibility of rollover than in the region B in the two dimensional region composed of the lateral acceleration GY and the roll rate RR. The rollover region C is a region in which there is a lower possibility of rollover than in the region D in the two dimensional region composed of the roll angle RA and the roll rate RR. In other words, it is determined whether there is a low possibility of rollover in step 110.

In this case, the vehicle state decision point a does not exist in the rollover region A, and the vehicle state decision point b does not exist in the rollover region C. Therefore, a negative determination is made in step 110, and the process proceeds to step 112. In step 112, it is determined whether a rollover flag ROF is set to "1". The rollover flag ROF set to "1" indicates that there was a low possibility of rollover when the seat belt retracting control program was executed last time. The rollover flag ROF set to "0" indicates other states. The rollover flag ROF is set to "0" by an initial setting process (not shown). Accordingly, a negative determination is made in step 112, and the seat belt retracting control program is temporarily terminated.

Next, a case where at least one of the vehicle state decision points a and b exists in the rollover region A or C will be described. In this case, after steps 100 to 108 are executed, an affirmative determination is made in step 110, and the process proceeds to step 116. It is determined whether the rollover flag ROF is set to "1" in step 116. Since the rollover flag ROF is set to "0" at this time, a negative determination is made in step 116, and the process proceeds to step 118.

In step 118, the electronic control unit 33 operates the belt retracting motor 22 via the drive circuit 36 such that the belt retracting motor 22 retracts the seat belt 11 by a predetermined amount. Next, the process proceeds to step 120, and the rollover flag is set to "1" in step 120, after which the seat belt retracting control program is temporarily terminated in step 114.

In a case where the vehicle is rolling over, and the vehicle state decision point a exists in the rollover region A, or the vehicle state decision point b exists in the rollover region C, steps 100 to 108 are executed, and then an affirmative determination is made in step 110, after which the process proceeds to step 116. In this case, since the rollover flag ROF is set to "1", an affirmative determination is made in step 116, and the seat belt retracting control program is temporarily terminated in step 114. Thereafter, as long as the vehicle remains in this state, after steps 100 to 110 are executed, steps 116, 114 are repeatedly executed, and the belt retracting motor 22 continues to be controlled such that the belt retracting motor 22 retracts the seat belt 11 by a predetermined amount. The seat belt retracting control is executed by the first belt retracting controller according to the invention. When a force is applied to the seat belt 11 such that torque larger than the drive torque of the belt retracting motor 22 is generated, the seat belt 11 can be pulled out.

Next, a case where the rollover of the vehicle is avoided will be described. In this case, the vehicle state decision point a enters a non-rollover region X1 from the rollover region A, and the vehicle state decision point b enters a non-rollover region X2 from the rollover region C. Accordingly, steps 100 to 106 are executed, and then negative determinations are made in step 108 and step 110, after which the process proceeds to step 112. In this case, since the rollover flag ROF is set to "1", an affirmative determination is made in step 112, and the process proceeds to step 122.

In step 122, the electronic control unit 33 cancels the operation of the belt retracting motor 22 via the drive circuit 36. In other words, the drive circuit 36 stops supply of electric current to the belt retracting motor 22 according to the control signal from the electronic control unit 33, which allows the occupant to pull out the seat belt 11 as usual. Therefore, the occupant is released from restraint of the seat belt 11. Next, the rollover flag ROF is set to "0" in step 124, and the seat belt retracting control program is temporarily terminated in step 114.

Meanwhile, in a case where rollover of the vehicle proceeds, and the vehicle state decision point a enters the rollover region B from the rollover region A, or the vehicle state decision point b enters the rollover region D from the rollover region C, steps 100 to 106 are executed, and then an affirmative determination is made in step 108, after which the process proceeds to step 126.

In step 126, the electronic control unit 33 operates the pretensioner 23 via the drive circuit 37 such that the pretensioner 23 retracts the seat belt 11 by a predetermined amount. In other words, the drive circuit 37 ignites the inflator 23a so as to generate the gas inside the inflator 27 according to the control signal from the electronic control unit 33. The pretensioner 23 is operated using the pressure of the gas so as to retract the seat belt 11 via the belt retracting mechanism portion 21, and prohibits the seat belt 11 from being pulled out. The seat belt retracting control is executed by the second belt retracting controller according to the invention.

After step 126 is executed, the electronic control unit 33 operates the curtain bag 26 via the drive circuit 34 in step 128. In other words, the drive circuit 34 ignites the inflator 27 so as to generate the gas inside the inflator 27. Thus, the curtain bag 26 is unfolded and expanded downward using the pressure of the gas. After step 128 is executed, the seat belt retracting control program is terminated in step 114.

According to the aforementioned first embodiment of the invention, in step 110 and steps 116 to 120, the belt retracting motor 22 is controlled so as to retract the seat belt 11 by the predetermined amount when it is determined that the vehicle will roll over according to the first determination condition that is less strict in the case where the vehicle rolls over. Then, in steps 108 and 126, the pretensioner 23 is controlled so as to retract the seat belt 11 by the predetermined amount, and to prohibit the seat belt 11 from being pulled out when it is determined that the vehicle will roll over according to the predetermined second determination condition that is strict. Therefore, the time required for the pretensioner 23 to finish retracting the seat belt 11 is short, as compared with a case where the seat belt 11 is retracted only by the pretensioner 23 without using the belt retracting motor 22. Thus, the occupant can be reliably restrained by the seat belt when the vehicle rolls over.

According to the aforementioned first embodiment, the belt retracting motor 22 is controlled so as to retract the seat belt 11 by the predetermined amount. Then, when it is determined that the vehicle will not roll over according to the predetermined second determination condition and the first determination condition in step 108 and step 110, the operation of the belt retracting motor 22 is cancelled in steps 112 and 122. Thus, the seat belt 11 is permitted to be pulled out. Therefore, when rollover of the vehicle is avoided after a situation occurs in which the vehicle is likely to roll over, the occupant can be released from restraint of the seat belt 11.

According to the aforementioned first embodiment, the possibility of rollover of the vehicle is determined based on the two dimensional map composed of the lateral acceleration GY and the roll rate RR of the vehicle, and the two dimensional map composed of the roll angle RA and the roll rate RR. Thus, the occupant can be reliably restrained by the seat belt both when the vehicle rolls over due to the lateral acceleration GY, and when the vehicle rolls over due to the roll angle RA.

However, the invention is not limited to the apparatus which determines the possibility of rollover of the vehicle based on both the combination of the lateral acceleration GY and the roll rate RR of the vehicle, and the combination of the roll angle RA and the roll rate RR. The possibility of rollover of the vehicle may be determined based on at least one of the aforementioned combinations. In this case, in step 108, one of the determination as to whether the vehicle state decision point a exists in the rollover region B and the determination as to whether the vehicle state decision point b exists in the rollover region D is made. Similarly, in step 110, one of the determination as to whether the vehicle state decision point a exists in the rollover region A, and the determination as to whether the vehicle state decision point b exists in the rollover region C.

In other words, among forms of rollover of the vehicle, for example, "flip-over" and "fall-over" occur due to the increased roll angle RA of the vehicle. However, when the roll rate RR is small, there is a possibility that the vehicle is running at a constant speed on a bank or the like. Therefore, the possibility of rollover of the vehicle is determined based on the roll rate RR and the roll angle RA. Thus, the occupant can be reliably restrained by the seat belt when the vehicle rolls over due to the roll angle RA. Also, among forms of rollover of the vehicle, for example, "trip-over", "turn-over", and "bounce-over" occur mainly due to the lateral acceleration GY of the vehicle. However, since the vehicle rolls over after the roll rate RR occurs, the possibility of rollover of the vehicle is determined based on the roll rate RR and the lateral acceleration GY. Thus, the occupant can be reliably restrained by the seat belt 11 when the vehicle rolls over due to the lateral acceleration GY.

Second Embodiment

Next, a second embodiment of the invention will be described. The electronic control unit 33 according to the second embodiment of the invention stores a seat belt retracting control program shown in FIG. 4, instead of the seat belt retracting control program shown in FIG. 2, and repeatedly executes the control program in FIG. 4 at predetermined short time intervals. Other portions of the configuration are the same as in the first embodiment.

The seat belt retracting control program starts in step 200. After the lateral acceleration GY and the roll rate RR are input, the roll rate RR is integrated with respect to time so as to calculate the roll angle RA in steps 202 to 206 that are the same as steps 102 to 106, respectively.

Figure 3B:
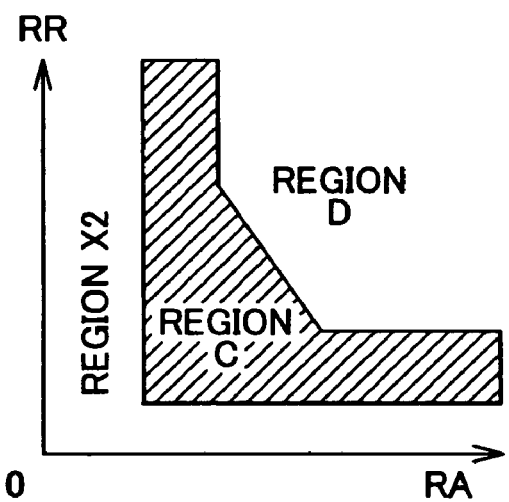
FIG. 3B is a map composed of a roll angle RA and a roll rate RR of the vehicle, which is used by the electronic control unit shown in FIG. 1 when determining the possibility of rollover of the vehicle according to the first embodiment and the second embodiment of the invention.

First, a case where there is no possibility of rollover of the vehicle will be described. In this case, negative determinations are made in steps 208 and 210 that are the same as steps 112 (or 116) and 110, and the seat belt retracting control program is temporarily terminated in step 212. As in the control program in FIG. 2, the rollover flag ROF set to "1" indicates that there was a low possibility of rollover when the seat belt retracting control program was executed last time. The rollover flag ROF set to "0" indicates other states. The rollover flag ROF is set to "0" by an initial setting process. Accordingly, a negative determination is made in step 208. In step 210, it is determined whether there is a low possibility of rollover of the vehicle, as in the control program in FIG. 2. Since the rollover region A or C is a region in which there is a low possibility of rollover of the vehicle as shown in FIG. 3A or FIG. 3B, a negative determination is made in step 210. Accordingly, the seat belt retracting control is not executed in this state.

Next, a case where there is a low possibility of rollover of the vehicle will be described. In this case, the vehicle state decision point a enters the rollover region A from the non-rollover region X1, or the vehicle state decision point b enters the rollover region C from the non-rollover region X2. Accordingly, an affirmative determination is made in step 210, and steps 214 to 218 are executed, after which the seat belt retracting control program is temporarily terminated in step 212. In step 214, the electronic control unit 33 operates the belt retracting motor 22 via the drive circuit 36 such that the belt retracting motor 22 retracts the seat belt 11 by a predetermined amount. In step 216, the rollover flag ROF is set to "1". In step 218, the electronic control unit 33 causes the timer T built-into the electronic control unit 33 to start an operation of measuring time.

Since the rollover flag ROF is set to "1" in this state, steps 200 to 206 are executed, and then an affirmative determination is made in step 208, after which the process proceeds to step 220. In this state, the vehicle state decision point a exists in the rollover region A or the vehicle state decision point b exists in the rollover region C. Accordingly, negative determinations are made in steps 220 and 228, and the belt retracting control program is temporarily terminated in step 212. Thereafter, as long as the vehicle remains in this state, steps 200 to 208, 220, 228, and 212 are repeatedly executed, and the belt retracting motor 22 continues to be controlled so as to retract the seat belt 11 by a predetermined amount. The seat belt retracting control is executed by the first belt retracting controller according to the invention. In this state, the seat belt can be pulled out as in the control program in FIG. 2.

When the possibility of rollover of the vehicle is eliminated in the aforementioned state, that is, rollover of the vehicle is avoided, the vehicle state decision point a enters the non-rollover region X1 from the rollover region A, and the vehicle state decision point b enters the non-rollover region X2 from the rollover region C. Accordingly, after steps 200 to 208 are executed, an affirmative determination is made in step 220, and steps 222 to 226 are executed, after which the seat belt retracting control program is temporarily terminated in step 212. In step 222, the drive circuit 36 stops supply of electric current to the belt retracting motor 22 according to the control signal from the electronic control unit 33. In step 224, the rollover flag ROF is set to "0". In step 226, the timer T is caused to stop the operation of measuring time, and is cleared. At this time, the seat belt 11 is returned to the state before the seat belt 11 is retracted, and the seat belt 11 is permitted to be pulled out.

Meanwhile, when the possibility of rollover of the vehicle becomes high, the vehicle state decision point a enters the rollover region B from the rollover region A, or the vehicle state decision point b enters the rollover region D from the rollover region C. Accordingly, in this case, after steps 200 to 208 are executed, the process proceeds to step 220, and a negative determination is made in step 220. In addition, an affirmative determination is made in step 228, and the process proceeds to step 230. In step 230, it is determined whether a predetermined time T0 has elapsed since the timer starts to measure time in step 218, based on a value measured by the timer T. The predetermined time T0 is set to a short time such that the pretensioner 23 and the curtain bag 26 are operated in time when the vehicle rolls over. When the predetermined time T0 has not elapsed, a negative determination is made in step 230, and the seat belt retracting control program is temporarily terminated in step 212.

When the predetermined time T0 has elapsed since the timer T starts to measure time, an affirmative determination is made in step 230, and steps 232 to 236 are executed. In step 232, the operation of the timer T is stopped. In step 234, the drive circuit 37 ignites the inflator 23a according to the control signal from the electronic control unit 33. The pretensioner 23 is operated using the pressure of the generated gas so as to retract the seat belt 11, and to prohibit the seat belt 11 from being pulled out. The seat belt retracting control is executed by the second belt retracting controller according to the invention. In step 236, the drive circuit 34 ignites the inflator 27 according to the control signal from the electronic control unit 33 such that the curtain bag 26 is unfolded and expanded downward using the pressure of the generated gas. After step 236 is executed, the seat belt retracting control program is terminated in step 212.

According to the aforementioned second embodiment of the invention, the belt retracting motor 22 is controlled so as to retract the seat belt 11 by a predetermined amount when it is determined that the vehicle will roll over according to the first determination condition that is less strict in the case where the vehicle rolls over, in steps 208 to 216. Then, the pretensioner 23 is controlled so as to retract the seat belt 11 by a predetermined amount, and to prohibit the seat belt 11 from being pulled out when it is determined that the vehicle will roll over according to the second determination condition that is strict, in steps 228, 230, and 234. Therefore, the time required for the pretensioner 23 to finish retracting the seat belt 11 is short, as compared with a case where the seat belt 11 is retracted only by the pretensioner 23 without using the belt retracting motor 22. Thus, the occupant can be reliably restrained by the seat belt when the vehicle rolls over.

Also, in the second embodiment of the invention, the belt retracting motor 22 is controlled so as to retract the seat belt 11 by the predetermined amount. Then, when it is determined that the vehicle will not roll over according to the determination conditions in steps 208 and 220, the operation of the belt retracting motor 22 is cancelled in step 222. Thus, the seat belt is permitted to be pulled out. Therefore, when rollover of the vehicle is avoided after a situation occurs in which the vehicle is likely to roll over, the occupant can be released from restraint of the retracted seat belt 11.

Also, as well as in the aforementioned second embodiment of the invention, the possibility of rollover of the vehicle is determined based on the two dimensional map composed of the combination of the lateral acceleration GY and the roll rate RR of the vehicle, and the two dimensional map composed of the combination of the roll angle RA and the roll rate RR. Therefore, the occupant can be reliably restrained by the seat belt 11 both when the vehicle rolls over due to the lateral acceleration GY, and when the vehicle rolls over due to the roll angle RA. However, the possibility of rollover of the vehicle may be determined based on one of the aforementioned combinations.

In the aforementioned second embodiment of the invention, the determination condition for operating the belt retracting motor 22 in step 210 is different from the determination condition for operating the pretensioner 23 in step 228. However, since the pretensioner 23 retracts the seat belt 11 by the predetermined amount after the belt retracting motor 22 retracts the seat belt 11 by the predetermined amount, the determination condition for operating the belt retracting motor 22 may be the same as the determination condition for operating the pretensioner 23.

Figure 5A:
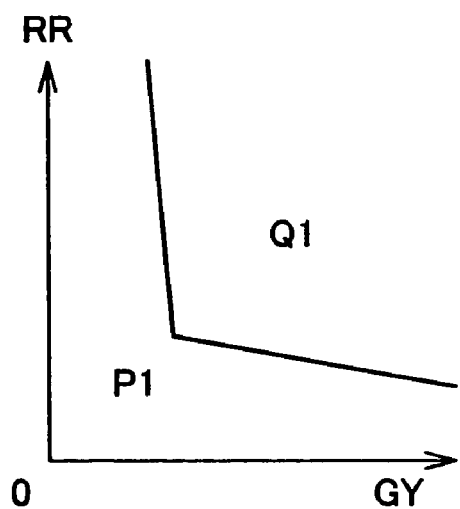
FIG. 5A is a map composed of a lateral acceleration GY and a roll rate RR of the vehicle, which is used by the electronic control unit shown in FIG. 1 when determining the possibility of rollover of the vehicle according to a modified example of the second embodiment of the invention.
Figure 5B:
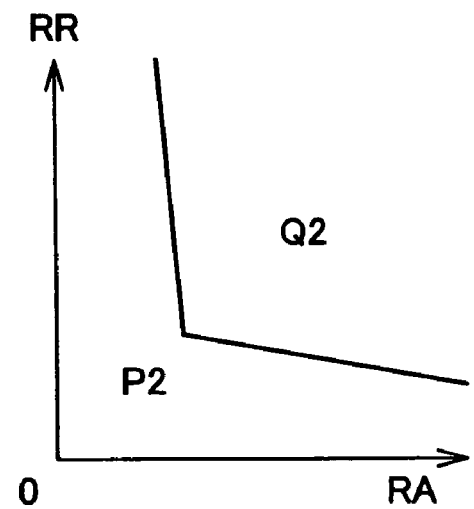
FIG. 5B is a map composed of a roll angle RA and a roll rate RR of the vehicle, which is used by the electronic control unit shown in FIG. 1 when determining the possibility of rollover of the vehicle according to a modified example of the second embodiment of the invention.

In this case, the rollover regions A and B in steps 210 and 228 may be changed to a rollover region Q1 shown in FIG. 5A. The rollover regions C and D in steps 210 and 228 may be changed to a rollover region Q2 shown in FIG. 5B. In FIG. 5A, a border between the rollover region Q1 and a non-rollover region P1 is formed by shifting a border between the rollover region A and a non-rollover region X1 shown in FIG. 3A toward the rollover region B side. In FIG. 5B, a border between the rollover region Q2 and a non-rollover region P2 is formed by shifting a border between the rollover region C and a non-rollover region X2 shown in FIG. 3B toward the rollover region D side. The predetermined time T0 is set to a value such that the pretensioner 23 and the curtain bag 26 are operated in time when the vehicle rolls over. Thus, it is possible to simplify the determination condition as to whether the vehicle will roll over.

Third Embodiment

Figure 6:
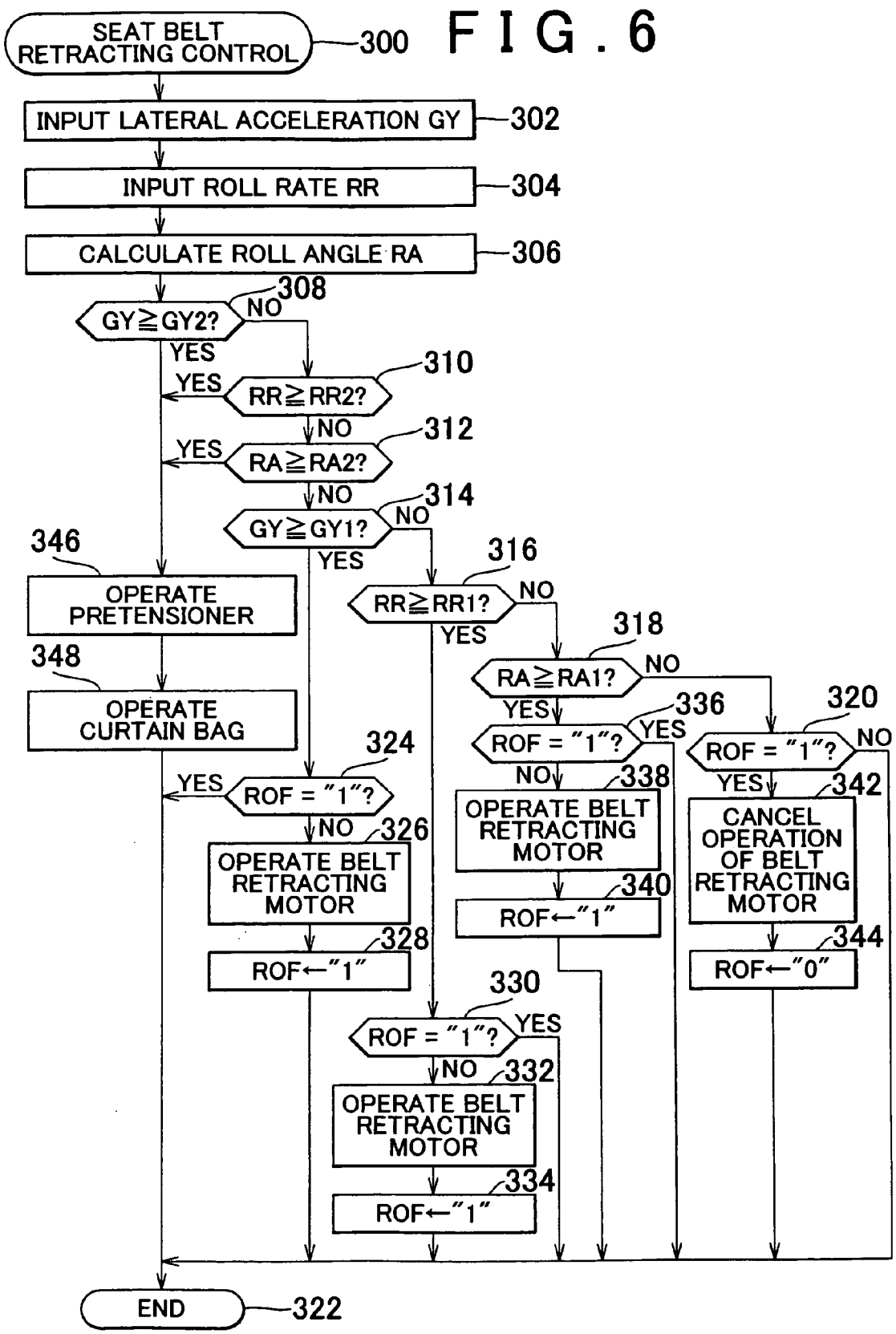
FIG. 6 is a flowchart of a seat belt retracting control program, which is executed by the electronic control unit shown in FIG. 1 according to the third embodiment of the invention.

Next, a third embodiment of the invention will be described. The electronic control unit 33 according to the third embodiment of the invention stores a seat belt retracting control program shown in FIG. 6, instead of the seat belt retracting control program shown in FIG. 2, and repeatedly executes the control program at predetermined short time intervals. Other portions of the configuration are the same as in the first embodiment.

The seat belt retracting control program starts in step 300. The lateral acceleration GY and the roll rate RR are input, and the roll rate RR is integrated with respect to time so as to calculate the roll angle RA in steps 302 to 306 that are the same as steps 102 to 106.

In a case where there is no possibility of rollover of the vehicle, negative determinations are made in all the steps 308 to 320. In step 322, the seat belt retracting control program is temporarily terminated. Predetermined values GY2, RR2, and RA2 in steps 308, 310, and 312 indicate the lateral acceleration, the roll rate, and the roll angle, respectively in the case where there is a high possibility of rollover of the vehicle. Predetermined values GY1, RR1, and RA1 in steps 314, 316, and 318 indicate the lateral acceleration, the roll rate, and the roll angle, respectively in the case where there is a low possibility of rollover of the vehicle as compared to the predetermined values GY2, RR2, and RA2. As in the control program in FIG. 2, the rollover flag ROF set to "1" indicates that there was a low possibility of rollover when the seat belt retracting control program was executed last time. The rollover flag ROF set to "0" indicates other states. The rollover flag ROF is set to "0" by an initial setting process.

In a case where there is a low possibility of rollover of the vehicle, one of the lateral acceleration GY, the roll rate RR, and the roll angle RA of the vehicle is equal to or larger than the predetermined value GY1, RR1, or RA1, and an affirmative determination is made in one of steps 314 to 318. A case where the lateral acceleration GY is equal to or larger than the predetermined value GY1 will be described. First, after steps 300 to 312 are executed, an affirmative determination is made in step 314, and steps 324 to 328 are executed. Then, the seat belt retracting control program is temporarily terminated in step 322. Since the rollover flag ROF is set to "0", a negative determination is made in step 324. In step 326, the electronic control unit 33 operates the belt retracting motor 22 via the drive circuit 36 such that the belt retracting motor 22 retracts the seat belt 11 by a predetermined amount. In step 328, the rollover flag ROF is set to "1".

Even in a case where the lateral acceleration GY is less than the predetermined value GY1, when the roll rate RR is equal to or larger than the predetermined value RR1, a negative determination is made in step 314, an affirmative determination is made in step 316, and steps 330 to 334 that are the same as steps 324 to 328, respectively are executed. Then, the seat belt retracting control program is temporarily terminated in step 322. Also, even in a case where both the lateral acceleration GY and the roll rate RR are less than the predetermined values GY1 and RR1, respectively, when the roll angle RA is equal to or larger than the predetermined value RA1, a negative determination is made in step 316, an affirmative determination is made in step 318, and steps 336 to 340 that are the same as steps 324 to 328, respectively are executed. Then, the seat belt retracting control program is temporarily terminated in step 322.

As long as the vehicle remains in the aforementioned state, that is, the state in which one of the lateral acceleration GY, the roll rate RR, and the roll angle RA of the vehicle is equal to or larger than the predetermined value GY1, RR1, or RA1, steps 300 to 312 are executed, and then an affirmative determination is made in step 314, 316, or 318, after which a determination process in step 324, 330, or 336 is executed. In this case, since the rollover flag ROF is set to "1", an affirmative determination is made in step 324, 330, or 336, and the seat belt retracting control program is temporarily terminated in step 322.

Thereafter, as long as the vehicle remains in the aforementioned state, one of i) steps 314, 324, and 322, ii) steps 316, 330, and 322, and iii) steps 318, 336, and 322 are repeatedly executed. Thus, the belt retracting motor 22 continues to be controlled so as to retract the seat belt 11 by a predetermined amount. The seat belt retracting control is executed by the first belt retracting controller according to the invention. In this state, the seat belt 11 can be pulled out as in the control program shown in FIG. 2.

When the possibility of rollover of the vehicle is eliminated in this state, that is, when rollover of the vehicle is avoided, negative determinations are made in steps 308 to 318, and the process proceeds to step 320. In this case, since the rollover flag ROF is set to "1", an affirmative determination is made in step 320, and the process proceeds to step 342. In step 342, the electronic control unit 33 cancels the operation of the belt retracting motor 22 via the drive circuit 36. Then, after the rollover flag ROF is set to "0" in step 344, the seat belt retracting control program is temporarily terminated in step 322. In this state, the seat belt is returned to the state before the seat belt 11 is retracted, and the seat belt 11 is permitted to be pulled out.

Meanwhile, when the possibility of rollover of the vehicle becomes high, one of the lateral acceleration GY, the roll rate RR, and the roll angle RA of the vehicle is equal to or larger than the predetermined value GY2, RR2, or RA2. In this case, an affirmative determination is made in one of steps 308 to 312, steps 346 and 348 are executed, and then the seat belt retracting control program is terminated in step 322. In other words, the drive circuit 37 ignites the inflator 23a such that the pretensioner 23 is operated, and the seat belt 11 is retracted and is prohibited from being pulled out, according to the control signal from the electronic control unit 33. The seat belt retracting control is executed by the second belt retracting controller according to the invention. The drive circuit 34 ignites the inflator 27 such that the curtain bag 27 is unfolded and expanded downward according to the control signal from the electronic control unit 33.

According to the aforementioned third embodiment, the belt retracting motor 22 is controlled so as to retract the seat belt 11 by the predetermined amount when it is determined that the vehicle will roll over according to the first determination condition that is less strict in the case where the vehicle rolls over, in one of i) steps 314, 324 to 328, ii) steps 316, 330 to 334, and iii) steps 318, 336 to 340. Then, the pretensioner 23 is controlled when it is determined that the vehicle will roll over according to the second determination condition that is strict in one of steps 308, 310, and 312, and step 346. Thus, the pretensioner 23 retracts the seat belt 11 by the predetermined amount, and prohibits the seat belt 11 from being pulled out. Therefore, the time required for the pretensioner 23 to finish retracting the seat belt 11 is short, as compared with a case where the seat belt 11 is retracted only by the pretensioner 23 without using the belt retracting motor 22. Thus, the occupant can be reliably restrained by the seat belt when the vehicle rolls over.

In the aforementioned third embodiment of the invention, the belt retracting motor 22 is controlled so as to retract the seat belt 11 by the predetermined amount as described above. Then, when it is determined that the vehicle will not roll over according to the determination conditions in steps 308 to 320, the operation of the belt retracting motor 22 is cancelled in step 342. Thus, the seat belt 11 is permitted to be pulled out.

Therefore, when rollover of the vehicle can be avoided after a situation occurs in which the vehicle is likely to roll over, the occupant can be released from restraint of the seat belt 11.

Also, as well as in the aforementioned third embodiment, the possibility of rollover of the vehicle is determined based on the lateral acceleration GY, the roll rate RR, and the roll angle RA of the vehicle in steps 308 to 318. Thus, the occupant can be reliably restrained by the seat belt 11 both when the vehicle rolls over due to the lateral acceleration GY, and when the vehicle rolls over due to the roll angle RA.

Also, in the aforementioned third embodiment, when one of the lateral acceleration GY, the roll rate RR, and the roll angle RA of the vehicle is equal to or larger than the predetermined value GY1, RR1, or RA1 in one of steps 314, 316, and 318, it is determined that the vehicle will roll over. Thus, the belt retracting motor 22 is controlled so as to retract the seat belt 11 by the predetermined amount earlier. Therefore, the occupant can be reliably restrained by the seat belt 11 when the vehicle rolls over.

Also, in the aforementioned third embodiment, three parameters, that is, the roll rate RR, the roll angle RA, and the lateral acceleration GY are detected or calculated. However, the possibility of rollover of the vehicle may be determined using only one or two of the aforementioned parameters.

Also, as well as in the third embodiment, if a flag indicating that there is a low possibility of rollover of the vehicle is provided, and the pretensioner 23 is operated after a predetermined time has elapsed since the vehicle is brought into the state where there is a low possibility of rollover, the first determination condition for operating the belt retracting motor 22 in steps 314 to 318 may be the same as the second determination condition for operating the pretensioner 23 in steps 308 to 312.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. A seat belt apparatus for a vehicle comprising:
    a first belt retractor which can retract a seat belt of the vehicle, and which permits the retracted seat belt to be pulled out;
    a second belt retractor which can retract the seat belt of the vehicle, and which prohibits the retracted seat belt from being pulled out;
    a movement state quantity detector which detects a movement state quantity of the vehicle that indicates a possibility of rollover of the vehicle;
    a first belt retracting controller which determines that the vehicle will roll over and controls the first belt retractor such that the first belt retractor retracts the seat belt when the movement state quantity detected by the movement state quantity detector satisfies a predetermined determination condition; and
    a second belt retracting controller which controls the second belt retractor such that the second belt retractor retracts the seat belt when the movement state quantity detected by the movement state quantity detector satisfies the predetermined determination condition after a predetermined time has elapsed since the first belt retracting controller determines the possibility of rollover of the vehicle.

2. The seat belt apparatus according to claim 1, further comprising:
    a belt pulling-out permission device which determines that the vehicle will not roll over and controls the first belt retractor such that the first belt retractor stops retracting the seat belt, and permits the seat belt to be pulled out, when the movement state quantity detected by the movement state quantity detector does not satisfy the predetermined determination condition after the first belt retractor has retracted the seat belt by a predetermined amount.

3. The seat belt apparatus according to claim 1, wherein the movement state quantity detected by the movement state quantity detector includes at least a roll rate and a roll angle of the vehicle.

4. The seat belt apparatus according to claim 1, wherein the movement state quantity detected by the movement state quantity detector includes at least a roll rate and a lateral acceleration of the vehicle.

5. The seat belt apparatus according to claim 1, wherein the movement state quantity detected by the movement state quantity detector includes a roll rate, a roll angle, and a lateral acceleration of the vehicle.

6. The seat belt apparatus according to claim 5, wherein the first belt retracting controller repeatedly determines whether each of the roll rate, the roll angle, and the lateral acceleration of the vehicle is equal to or larger than a corresponding predetermined value, and determines that the vehicle will roll over when at least one of the roll rate, the roll angle, and the lateral acceleration is equal to or larger than the corresponding predetermined value.

7. The seat belt apparatus according to claim 1, wherein the first belt retractor is motor.

8. The seat belt apparatus according to claim 1, wherein the second belt retractor is a pretensioner.

* * * * *